(12) United States Patent
Yamauchi et al.

(10) Patent No.: US 9,988,481 B2
(45) Date of Patent: Jun. 5, 2018

(54) POLYISOCYANATE COMPOSITION, COATING COMPOSITION, COATING FILM AND METHOD FOR PRODUCING SAME, AND HUMIDITY STABILIZATION METHOD

(71) Applicant: ASAHI KASEI KABUSHIKI KAISHA, Tokyo (JP)

(72) Inventors: Masakazu Yamauchi, Tokyo (JP); Hironori Katagawa, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/501,065

(22) PCT Filed: Sep. 4, 2015

(86) PCT No.: PCT/JP2015/075230
§ 371 (c)(1),
(2) Date: Feb. 1, 2017

(87) PCT Pub. No.: WO2016/035887
PCT Pub. Date: Mar. 10, 2016

(65) Prior Publication Data
US 2017/0253688 A1 Sep. 7, 2017

(30) Foreign Application Priority Data
Sep. 4, 2014 (JP) .................................. 2014-179998

(51) Int. Cl.
C08G 12/00 (2006.01)
C08G 18/09 (2006.01)
C08G 18/79 (2006.01)
C09D 175/04 (2006.01)

(52) U.S. Cl.
CPC ......... *C08G 18/097* (2013.01); *C08G 18/095* (2013.01); *C08G 18/792* (2013.01); *C08G 18/797* (2013.01); *C08G 18/798* (2013.01); *C09D 175/04* (2013.01)

(58) Field of Classification Search
CPC .. C08G 12/006; C08G 18/097; C08G 18/095; C08G 18/797; C08G 18/792; C08G 18/798; C09D 175/04
USPC ........................................................ 524/513
See application file for complete search history.

(56) References Cited

U.S. PATENT DOCUMENTS

| 5,354,834 A | 10/1994 | Yoshida et al. | |
| 5,882,544 A * | 3/1999 | Richter | C07D 498/04 252/183.12 |
| 5,914,383 A | 6/1999 | Richter et al. | |
| 7,067,654 B2 * | 6/2006 | Richter | C07D 229/00 540/202 |
| 9,790,194 B2 * | 10/2017 | Richter | C08G 18/7831 |
| 2003/0078361 A1 | 4/2003 | Richter et al. | |
| 2004/0106789 A1 * | 6/2004 | Richter | C07D 229/00 540/202 |
| 2009/0131603 A1 | 5/2009 | Asahina et al. | |
| 2009/0234091 A1 | 9/2009 | Richter et al. | |
| 2014/0343280 A1 * | 11/2014 | Richter | C08G 18/7831 544/67 |

FOREIGN PATENT DOCUMENTS

| EP | 0524501 A1 * | 1/1993 | ........... C07D 251/34 |
| JP | H05-222007 A | 8/1993 | |
| JP | H10-182652 A | 7/1998 | |
| JP | 3055197 B2 | 4/2000 | |
| JP | 2004-175803 A | 6/2004 | |
| JP | 2004-175888 A | 6/2004 | |
| JP | 2009-221478 A | 10/2009 | |
| JP | 2013-224350 A | 10/2013 | |
| JP | 2013224350 A * | 10/2013 | |
| JP | 2013-245341 A | 12/2013 | |
| JP | 2013245341 A * | 12/2013 | |
| JP | 2015-127368 A | 7/2015 | |
| WO | 2007/046470 A1 | 4/2007 | |
| WO | 2013/079614 A2 | 6/2013 | |

OTHER PUBLICATIONS

International Search Report issued with respect to Application No. PCT/JP2015/075230, dated Dec. 8, 2015.
International Preliminary Report on Patentability issued with respect to Application No. PCT/JP2015/075230, dated Mar. 7, 2017.
Supplementary European Search Report issued with respect to Application No. 15838067.5 dated Jul. 25, 2017.

* cited by examiner

*Primary Examiner* — Michael M Bernshteyn
(74) *Attorney, Agent, or Firm* — Greenblum & Bernstein, P.L.C.

(57) ABSTRACT

The present invention provides a polyisocyanate composition wherein the composition is obtained from an aliphatic diisocyanate unit including 1,6-diisocyanatohexane, and has an isocyanurate group, a uretdione group, a uretonimine group, and an iminooxadiazinedione group, and the molar ratio of the uretonimine group to the isocyanurate group is 0.0010 to 0.0050, and the molar ratio of the iminooxadiazinedione group to the isocyanurate group is 0.00050 to 0.30.

6 Claims, No Drawings

POLYISOCYANATE COMPOSITION, COATING COMPOSITION, COATING FILM AND METHOD FOR PRODUCING SAME, AND HUMIDITY STABILIZATION METHOD

TECHNICAL FIELD

The present invention relates to a polyisocyanate composition, a coating composition, a coating film and a method for producing the coating film, and a humidity stabilization method.

BACKGROUND ART

Polyisocyanate compositions obtained from aliphatic diisocyanates including 1,6-diisocyanatohexane (hereinafter, sometimes referred to as HDI; hexamethylene diisocyanate) and having an isocyanurate structure are excellent in weatherability and heat resistance, and accordingly have been widely used in various applications.

Recently, because of growing interest in global environmental protection, technology development has been actively performed toward the lowering of the viscosity of polyisocyanate used as a curing agent (for example, see Patent Literature 1). This is because the lowering of the viscosities of polyisocyanates allows the amounts of the organic solvents used in coating compositions to be reduced.

In this connection, various techniques have been disclosed on the techniques for lowering the viscosities of various polyisocyanates derived from, for example, aliphatic diisocyanates including HDI. From such techniques, here is quoted, for example, a technique related to a low viscosity polyisocyanate having a uretdione group (for example, see Patent Literature 2).

Additionally, there has been proposed a polyisocyanate composition excellent in curability and storage stability in spite of having a uretdione group (for example, see Patent Literature 3).

Moreover, as a technique to improve the stability in a state of being brought into contact with humidity, there has been disclosed a technique for adding a phosphorus-based compound such as an acidic phosphoric acid compound or an acidic phosphoric acid ester to an isocyanurate-type polyisocyanate (for example, see Patent Literature 4).

CITATION LIST

Patent Literature

Patent Literature 1: Japanese Patent Laid-Open No. 05-222007
Patent Literature 2: Japanese Patent No. 3055197
Patent Literature 3: International Publication No. WO 2007/046470
Patent Literature 4: Japanese Patent Laid-Open No. 2004-175888

SUMMARY OF INVENTION

Technical Problem

It is possible to obtain a low viscosity polyisocyanate by using the techniques described in Patent Literature 1 and Patent Literature 2. However, the polyisocyanates obtained by using these techniques have a problem such that the polyisocyanates concerned are low in cross-linking degree, tend to undergo the increase of the diisocyanate monomer concentration during storage, and are limited in the use thereof. Moreover, in general, polyisocyanate compositions are high in reactivity, hence are poor in the stability in a state of being brought into contact with humidity, and are desired to be improved in the foregoing stability; the polyisocyanate composition described in Patent Literature 3 also has a problem such that no sufficient properties are obtained with respect to the humidity stability. The technique described in Patent Literature 4 can improve the humidity stability, but has a problem such that the viscosities of isocyanurate-type polyisocyanate compositions are high.

Accordingly, an object of the present invention is to provide a polyisocyanate composition low in viscosity, excellent in storage stability and humidity stability, and also capable of forming a coating film excellent in the adhesiveness with foundation coating films.

Solution to Problem

The present inventors made a diligent study, and consequently have perfected the present invention by discovering that the following polyisocyanate composition is low in viscosity, excellent in storage stability and humidity stability, and also capable of forming a coating film excellent in the adhesiveness with foundation coating films: a polyisocyanate composition obtained from an aliphatic diisocyanate unit including at least HDI, and having an isocyanurate group, a uretdione group, a uretonimine group and an iminooxadiazinedione group, wherein the molar ratio of the aforementioned uretonimine group to the aforementioned isocyanurate group and the molar ratio of the aforementioned iminooxadiazinedione group to the aforementioned isocyanurate group are set to fall within specific ranges, respectively.

[1]
A polyisocyanate composition wherein the composition is obtained from an aliphatic diisocyanate unit including 1,6-diisocyanatohexane, and has an isocyanurate group, a uretdione group, a uretonimine group, and an iminooxadiazinedione group and
the molar ratio of the uretonimine group to the isocyanurate group is 0.0010 to 0.0050, and the molar ratio of the iminooxadiazinedione group to the isocyanurate group is 0.00050 to 0.30.

[2]
The polyisocyanate composition according to [1] further including an isocyanurate.uretdione bonded tetramer represented by following formula (I):

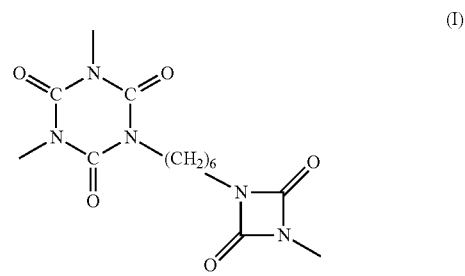

[3]
A coating composition comprising the polyisocyanate composition according to [1] or {2}, and an acrylic polyol and/or a polyester polyol.

[4]
A method for producing a coating film including a step of curing the coating composition according to [3].
[5]
A coating film prepared by curing the coating composition according to [3].
[6]
A method for humidity stabilizing a polyisocyanate composition obtained from an aliphatic diisocyanate unit including 1,6-diisocyanatohexane, and having an isocyanurate group, a uretdione group, a uretonimine group, and an iminooxadiazinedione group,
wherein the molar ratio of the uretonimine group to the isocyanurate group is set to be 0.0010 to 0.0050, and the molar ratio of the iminooxadiazinedione group to the isocyanurate group is set to be 0.00050 to 0.30.

Advantageous Effects of Invention

The polyisocyanate composition according to the present invention is low in viscosity and excellent in storage stability and humidity stability, and is capable of forming a coating film excellent in the adhesiveness with foundation coating films.

DESCRIPTION OF EMBODIMENTS

Hereinafter, the mode for carrying out the present invention (hereinafter, simply referred to as the "present embodiment") is described in detail. The following present embodiment is an exemplification for describing the present invention, and is not intended to limit the present invention to the following contents. The present invention can be implemented as appropriately modified within the scope of the gist thereof. It is to be noted that unless otherwise specified, "(meth)acryl" includes methacryl and acryl, "(meth)acrylate" includes methacrylate and acrylate.
[Polyisocyanate Composition]
The polyisocyanate composition of the present embodiment is obtained from an aliphatic diisocyanate unit including at least HDI (1,6-diisocyanatohexane), and has an isocyanurate group, a uretdione group, a uretonimine group and an iminooxadiazinedione group. Additionally, the molar ratios of the uretonimine group/the isocyanurate group and the iminooxadiazinedione group/the isocyanurate group fall within the following specific ranges, respectively. In the polyisocyanate composition of the present embodiment, the molar ratio of the uretonimine group to the isocyanurate group is 0.0010 to 0.0050, and the molar ratio of the iminooxadiazinedione group to the isocyanurate group is 0.00050 to 0.30. The polyisocyanate composition of the present embodiment has the above-described constitution, and hence is low in viscosity and excellent in storage stability and humidity stability, and is capable of forming a coating film excellent in the adhesiveness with foundation coating films.
(Aliphatic Diisocyanate)
The aliphatic diisocyanate is not limited to the following, but is preferably aliphatic diisocyanates having 4 to 30 carbon atoms. Examples of the aliphatic diisocyanate include, in addition to HDI, 1,4-diisocyanatobutane, 1,5-diisocyanatopentane, 2,2,4-trimethyl-1,6-diisocyanatohexane and lysine diisocyanate. In particular, from the viewpoint of industrial easy availability and the reactivity in the production of polyisocyanate, the polyisocyanate composition obtained from the aliphatic diisocyanate unit including HDI is used in the present embodiment. The aliphatic diisocyanates may be used each alone or in combinations of two or more thereof.

The polyisocyanate composition of the present embodiment may partially include an alicyclic diisocyanate. The alicyclic diisocyanate is not limited to the following, but is preferably alicyclic diisocyanates having 8 to 30 carbon atoms. Examples of the alicyclic diisocyanate include isophorone diisocyanate (hereinafter, described as IPDI), 1,3-bis(isocyanatomethyl)-cyclohexane, 4,4'-dicyclohexylmethane diisocyanate, norbornene diisocyanate, hydrogenated xylylene diisocyanate. Among these, IPDI is preferable from the viewpoint of weatherability and industrial easy availability. The alicyclic diisocyanates may be used each alone or in combinations of two or more thereof.

The polyisocyanate composition of the present embodiment has an isocyanurate group. The isocyanurate group as one of the constituent components of the polyisocyanate composition of the present embodiment is a functional group originating from a polyisocyanate composed of three diisocyanate monomer molecules and is represented by the following formula (II):

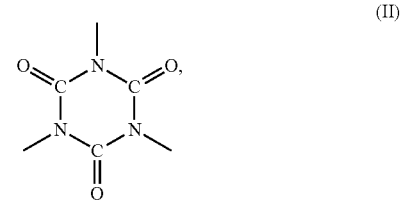

The concentration of the isocyanurate trimer in the polyisocyanate composition of the present embodiment is not particularly limited, but is preferably 55 to 95% by mass and more preferably 60 to 95% by mass. From the viewpoint of reducing the viscosity of the polyisocyanate composition of the present embodiment, the foregoing concentration is preferably 55% by mass or more, and from the viewpoint of maintaining high the yield of the polyisocyanate composition, the foregoing concentration is preferably 95% by mass or less. The concentration of the isocyanurate trimer can be measured by gel permeation chromatography (hereinafter, sometimes described as "GPC").

The polyisocyanate composition of the present embodiment has a uretdione group. Herewith, the viscosity can be decreased. The uretdione group as one of the constituent components of the polyisocyanate composition of the present embodiment is a functional group originating from the polyisocyanate composed of two diisocyanate monomer molecules, and is represented by the following formula (III):

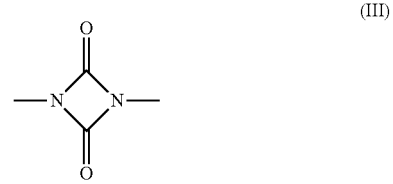

In the polyisocyanate composition of the present embodiment, the molar ratio of the uretdione group to the isocyanurate group is not particularly limited, but is preferably 0.010 to 0.50. The lower limit of the molar ratio is more preferably 0.15, further preferably 0.20 and furthermore preferably 0.30. The upper limit of the molar ratio is more preferably 0.45, further preferably 0.40 and furthermore preferably 0.38. From the viewpoint of decreasing the viscosity of the polyisocyanate composition of the present embodiment, the molar ratio is preferably 0.010 or more; from the viewpoint of improving the cross-linking degree, the molar ratio is preferably 0.50 or more. The molar ratio of the uretdione group to the isocyanurate group can be determined by a $^{13}$C-NMR measurement. Specifically, the above-described molar ratio can be measured according to the method described in below-described Examples.

Examples of the method for setting the molar ratio of the uretdione group to the isocyanurate group so as to fall within a range from 0.010 to 0.50 include the following: a method in which the isocyanuration reaction of 1,6-diisocyanatohexane is performed, then the catalyst is deactivated, and subsequently the molar ratio is controlled by allowing the reaction to proceed at a temperature of approximately 140 to 160° C., more preferably 145 to 165° C., for approximately a few hours, more preferably for 1 hour to 3 hours; and a method in which with the polyisocyanate composition obtained by performing the isocyanuration reaction of 1,6-diisocyanatohexane, partially mixed is a polyisocyanate composition obtained by adding a uretdionization catalyst such as a tertiary phosphine to 1,6-diisocyanatohexane, and by allowing the reaction mixture to react at a temperature of approximately 20 to 80° C. for approximately a few hours to a few tens hours. Of the above-described methods, from the viewpoint of easy availability, preferable is the former method in which the isocyanuration reaction of 1,6-diisocyanatohexane is performed, then the catalyst is deactivated, and subsequently the reaction is allowed to proceed at a temperature of approximately 145 to 165° C. for approximately a few hours.

The polyisocyanate composition of the present embodiment has a uretonimine group. The uretonimine group as one of the constituent components of the polyisocyanate composition of the present embodiment is a functional group originating from the polyisocyanate composed of three diisocyanate monomer molecules, and is represented by the following formula (IV):

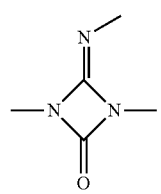

(IV)

The molar ratio of the uretonimine group to the isocyanurate group is 0.0010 to 0.0050. The lower limit of the molar ratio is more preferably 0.0012, further preferably 0.0015 and furthermore preferably 0.0020. The upper limit of the molar ratio is more preferably 0.0045, further preferably 0.0040 and furthermore preferably 0.0035. The molar ratio being 0.0010 or more allows the humidity stability of the polyisocyanate composition of the present embodiment to be satisfactory, and the molar ratio being 0.0050 or less allows the increase of the diisocyanate monomer concentration after storage to be suppressed. The molar ratio of the uretonimine group to the isocyanurate group can be measured by the method described in below-described Examples.

Examples of the method for setting the molar ratio of the uretonimine group to the isocyanurate group so as to fall within a range from 0.0010 to 0.0050 include the following: a method in which the isocyanuration reaction of 1,6-diisocyanatohexane is performed, then the catalyst is deactivated, and subsequently the molar ratio is controlled by allowing the reaction to proceed at a temperature of approximately 140 to 160° C., more preferably 145 to 155° C., for approximately a few hours, more preferably for 1 hour to 3 hours; and a method in which with the polyisocyanate composition obtained as described above, partially mixed is a polyisocyanate composition obtained by using a heterocyclic ring-containing phosphorus-based compound such as 1-butylphosphorane as a catalyst for 1,6-diisocyanatohexane, and by allowing the reaction mixture to react at a temperature of approximately 20 to 80° C. for approximately a few hours to a few tens hours. Of the above-described methods, from the viewpoint of easy availability, preferable is the former method in which the isocyanuration reaction of 1,6-diisocyanatohexane is performed, then the catalyst is deactivated, and subsequently the reaction is allowed to proceed at a temperature of approximately 140 to 160° C. for approximately a few hours.

The polyisocyanate composition of the present embodiment has an iminooxadiazinedione group. The iminooxadiazinedione group as one of the constituent components of the polyisocyanate composition of the present embodiment is a functional group originating from the polyisocyanate composed of three diisocyanate monomer molecules, and is represented by the following formula (V):

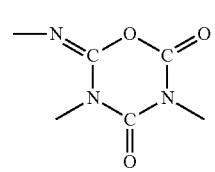

(V)

The molar ratio of the iminooxadiazinedione group to the isocyanurate group in the polyisocyanate composition of the present embodiment is 0.00050 to 0.30. The lower limit of the molar ratio is preferably 0.0010, more preferably 0.0015, further preferably 0.0020 and furthermore preferably 0.0025. The upper limit of the molar ratio is preferably 0.20, more preferably 0.10, further preferably 0.050 and furthermore preferably 0.025. The molar ratio being 0.00050 or more allows the humidity stability of the polyisocyanate composition of the present embodiment to be developed, and the molar ratio being 0.30 or less allows a coating film excellent in the adhesiveness with foundation coating films to be formed. The molar ratio of the iminooxadiazinedione group to the isocyanurate group can be measured by the method described in below-described Examples.

Examples of the method for setting the molar ratio of the iminooxadiazinedione group to the isocyanurate group so as to fall within the above-described range include the following: a method in which the isocyanuration reaction of 1,6-diisocyanatohexane is performed, then the catalyst is deactivated, and subsequently the molar ratio is controlled by allowing the reaction to proceed at a temperature of approximately 140 to 160° C., for approximately a few hours; and a method in which with the polyisocyanate composition obtained as described above, partially mixed is a polyisocyanate composition obtained by using a heterocyclic ring-containing phosphorus-based compound such as 1-butylphosphorane as a catalyst for 1,6-diisocyanatohexane, and by allowing the reaction mixture to react at a temperature of approximately 20 to 80° C. for approximately a few hours to a few tens hours. Of the above-described methods, from the viewpoint of easy availability, preferable is the former method in which the isocyanuration reaction of 1,6-diisocyanatohexane is performed, then the catalyst is deactivated, and subsequently the reaction is allowed to proceed at a temperature of approximately 140 to 160° C. for approximately a few hours.

The polyisocyanate composition of the present embodiment preferably further includes the isocyanurate.uretdione bonded tetramer represented by the following formula (I). The isocyanurate.uretdione bonded tetramer is a four molecule structure originating from a polyisocyanate composed of four diisocyanate monomer molecules, and is represented by the following formula (I):

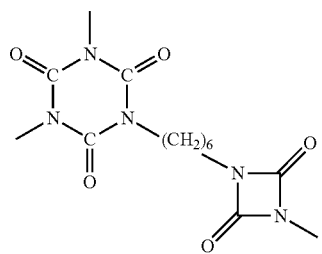

(I)

In the polyisocyanate composition of the present embodiment, the presence ratio of the isocyanurate.uretdione bonded tetramer to the isocyanurate trimer is not particularly limited, but is preferably 0.010 to 0.10 in terms of the area proportion in liquid chromatography. The lower limit of the area proportion is more preferably 0.020, further preferably 0.030 and furthermore preferably 0.050. The upper limit of the area proportion is more preferably 0.090, further preferably 0.085 and furthermore preferably 0.080. The area proportion being 0.010 or more allows the adhesiveness with foundation of the coating film using the polyisocyanate composition to tend to be satisfactory, and the area proportion being 0.10 or less allows the increase of the diisocyanate monomer after storage to tend to be further reduced. The presence ratio of the isocyanurate-uretdione bonded tetramer to the isocyanurate trimer can be measured by the method described in below-described Examples.

Examples of the method for controlling the presence ratio of the isocyanurate.uretdione bonded tetramer to the isocyanurate trimer, namely, the area ratio in liquid chromatography so as to fall within the above-described range include a method in which the isocyanuration reaction of 1,6-diisocyanatohexane is performed, then the catalyst is deactivated, and subsequently the presence ratio is controlled by allowing the reaction to proceed at a temperature of approximately 140 to 170° C., for approximately a few hours.

The polyisocyanate composition of the present embodiment may also include an allophanate group. The allophanate group is formed from the hydroxyl group of an alcohol and an isocyanate group, and is represented by the following formula (VI):

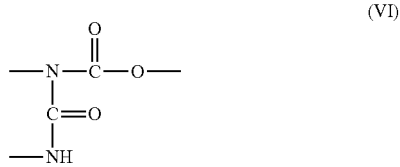

(VI)

The alcohol usable in the polyisocyanate composition of the present embodiment is preferably an alcohol formed of only carbon, hydrogen and oxygen, and more preferably a monoalcohol. In particular, preferable is a monoalcohol having a molecular weight of 200 or less. Examples of such an alcohol include, without being limited to, the following: monoalcohols such as methanol, ethanol, propanol, butanol, pentanol, hexanol, heptanol, octanol and nonanol; and dialcohols such as ethylene glycol, 1,3-butanediol, neopentyl glycol and 2-ethylhexanediol. These may be used each alone or in combinations of two or more thereof.

The molar ratio of the allophanate group derived from an alcohol to the isocyanurate group is preferably 0.010 to 0.20, more preferably 0.010 to 0.10 and further preferably 0.010 to 0.05. From the viewpoint of improving the cross-linking degree, the above-described molar ratio is preferably 0.20 or less. The molar ratio of the allophanate group to the isocyanurate group can be measured by the method described in below-described Examples.

The polyisocyanate composition of the present embodiment may include, in addition to the foregoing, a urethane group, a urea group, a biuret group, a carbodiimide group and the like.

The diisocyanate monomer concentration in the polyisocyanate composition of the present embodiment is preferably 1.0% by mass or less, more preferably 0.5% by mass or less, further preferably 0.3% by mass and furthermore preferably 0.2% by mass. From the viewpoint of improving the cross-linking degree, the diisocyanate monomer concentration is preferably 1.0% by mass or less. The diisocyanate monomer concentration in the polyisocyanate composition of the present embodiment can be measured by a method according to the below-described measurement of the HDI monomer mass concentration.

The viscosity at 25° C. of the polyisocyanate composition of the present embodiment is not particularly limited, but is preferably 100 to 1500 mPa·s. The lower limit of the above-described viscosity is more preferably 140 mPa·s, further preferably 180 mPa·s, furthermore preferably 200 mPa·s and yet furthermore preferably 220 mPa·s. The upper limit of the above-described viscosity is more preferably 1000 mPa·s, further preferably 800 mPa·s, furthermore preferably 700 mPa·s and yet furthermore preferably 600 mPa·s. From the viewpoint of improving the cross-linking degree, the foregoing viscosity is preferably 100 mPa·s or more, and from the viewpoint of being capable of setting high the solid content concentration of the coating material using the polyisocyanate composition, the foregoing viscosity is preferably 1500 mPa·s or less. The viscosity of the polyisocyanate composition of the present embodiment can be measured with a polyisocyanate composition purified so as to have a nonvolatile component concentration of 98% by mass or more, by using an E-type viscometer (manufactured by Tokimec Inc.); specifically, the foregoing viscosity can be measured by the method described in below-described Examples.

The content (NCO content) of the isocyanate group in the polyisocyanate composition of the present embodiment is preferably 21 to 25% by mass. The lower limit of the NCO content is more preferably 22% by mass, and the upper limit of the NCO content is more preferably 24% by mass. From the viewpoint of making satisfactory the coating film physical properties such as the coating film hardness, the NCO content is preferably 21% by mass or more, and from the viewpoint of reducing the diisocyanate monomer concentration, the NCO content is preferably 25% by mass or less. The NCO content can be determined by neutralizing the isocyanate group in the polyisocyanate composition with excessive 2N amine, and then performing back-titration with 1N hydrochloric acid. The NCO content is a value based on the solid content of the polyisocyanate composition, and the solid content of the polyisocyanate composition can be measured according to the method described in the below-described nonvolatile content measurement.

The number average molecular weight of the solid content in the polyisocyanate composition of the present embodiment is not particularly limited, but is preferably 400 to 1,000. The lower limit of the number average molecular weight is more preferably 430, further preferably 460 and furthermore preferably 480. The upper limit of the number average molecular weight is more preferably 800, further preferably 700 and furthermore preferably 600. The number average molecular weight set to be 400 or more allows the yield of the obtained polyisocyanate composition to tend to be further improved. The number average molecular weight set to be 1,000 or less allows the gloss of the obtained coating film to tend to be further improved. The number average molecular weight can be determined by gel permeation chromatography (GPC).

[Method for Producing Polyisocyanate Composition]

Hereinafter, an example of the method for producing the polyisocyanate composition of the present embodiment is described. The starting material of the polyisocyanate composition of the present embodiment uses at least HDI (1,6-diisocyanatohexane). The polyisocyanate composition of the present embodiment is obtained as follows: the isocyanuration reaction for forming the isocyanurate group derived from the isocyanate group, the uretdionization reaction for forming the uretdione group, the uretoniminization reaction for forming the uretonimine group, and the iminooxadiazinedione formation reaction for forming the iminooxadiazinedione group are successively performed or some of these reactions are performed in parallel with each other in the presence of excessive diisocyanate monomer, and after completion of the reactions, the unreacted diisocyanate monomer is removed to yield the polyisocyanate composition. Alternatively, the polyisocyanate composition of the present embodiment is also obtained by mixing the reaction products obtained by performing the above-described four reactions separately. Because of easy availability, the method in which the four reactions are successively performed, or the method in which some of the four reactions are performed in parallel with each other is preferable. Moreover, as auxiliary starting materials, alcohol compounds such as an alkyl monoalcohol and an alkyl diol can be used in combination. Here, when an alcohol compound is used, as described above, it is preferable to use the alcohol compound in such a way that the molar ratio of the allophanate group to the isocyanurate group in the polyisocyanate composition falls within a range from 0.010 to 0.20.

Preferably, a polymerization catalyst is added to HDI as a starting material and the above-described auxiliary starting material(s), and the reaction is allowed to proceed until the predetermined polymerization degree, then, if necessary, the unreacted HDI is removed, and thus, the polyisocyanate composition can be obtained.

When the isocyanurate group-containing polyisocyanate is derived from the diisocyanate monomer, usually an isocyanuration reaction catalyst is used. As the isocyanuration reaction catalyst, an isocyanuration reaction catalyst having basicity is preferable. Specific examples of such an isocyanuration reaction catalyst are presented in the following 1) to 7).

1) Hydroxides of tetraalkylammoniums such as tetramethylammonium and tetraethylammonium, or salts between these tetraalkylammoniums and weak organic acids such as acetic acid and capric acid 2) Hydroxides of hydroxyalkylammoniums such as trimethylhydroxypropylammonium, trimethylhydroxyethylammonium, triethylhydroxypropylammonium and triethylhydroxyethylammonium; or salts between these hydroxyalkylammoniums and weak organic acids such as acetic acid and capric acid 3) Metal salts between alkylcarboxylic acids such as acetic acid, caproic acid, octylic acid and myristic acid and metals such as tin, zinc, lead, sodium and potassium 4) Metal alcoholates of metals such as sodium and potassium 5) Aminosilyl group-containing compounds such as hexamethyldisilazane 6) Mannich bases 7) Combined use of tertiary amines and epoxy compounds From the viewpoint of catalytic efficiency, the foregoing 1), 2) and 3) are preferable. The weak organic acid salts of 1) are more preferable.

The isocyanuration reaction is preferably performed by using the above-described catalyst in an amount of 10 to 1000 ppm, more preferably 10 to 500 ppm and further preferably 10 to 100 ppm based on the mass of the fed diisocyanate, and by setting the isocyanuration reaction temperature at 50 to 120° C. The lower limit of the reaction temperature is more preferably 54° C., further preferably 57° C. and furthermore preferably 60° C. The upper limit of the reaction temperature is more preferably 100° C., further preferably 90° C. and furthermore preferably 80° C. The isocyanuration reaction temperature being 120° C. or lower allows the variations of the properties such as coloration to tend to be able to be suppressed.

The uretdione group present in the polyisocyanate composition of the present embodiment is obtained by using a uretdionization reaction catalyst. Specific compound examples of the uretdionization reaction catalyst include, without being limited to, the following: trialkylphosphines, tertiary phosphines, such as tri-n-butylphosphine and tri-n-octylphosphine; tris(dialkylamino)phosphines such as tris-(dimethylamino) phosphine; and cycloalkylphosphines such as cyclohexyl-di-n-hexylphosphine. Many of these compounds simultaneously promote the isocyanuration reaction, and produce an isocyanurate group-containing polyisocyanate in addition to the uretdione group-containing polyisocyanate. At the time of attaining the desired yield, a deactivator of the uretdionization reaction catalyst such as phosphoric acid or methyl p-toluenesulfonate is added to terminate the uretdionization reaction. The uretdionization reaction is preferably performed by using the above-described catalyst in an amount of 10 to 10000 ppm, more preferably 10 to 1000 ppm, further preferably 10 to 500 ppm based on the mass of the fed diisocyanate and by setting the uretdionization reaction temperature at 20 to 120° C. The lower limit of the reaction temperature is more preferably 25° C., further preferably 30° C. and furthermore preferably 35° C. The upper limit of the reaction temperature is more preferably 110° C., further preferably 100° C. and furthermore preferably 90° C. The uretdionization reaction temperature being 120° C. or lower allows the variations of the properties such as coloration to tend to be able to be suppressed.

Without using such a uretdionization reaction catalyst as described above, the uretdione group can also be obtained by heating the monomer of diisocyanate. The heating temperature concerned is preferably 130° C. to 180° C. The lower limit of the heating temperature is more preferably 140° C., further preferably 145° C., furthermore preferably 150° C. and yet furthermore preferably 155° C. The upper limit of the heating temperature is more preferably 170° C., further preferably 165° C., furthermore preferably 162° C. and yet furthermore preferably 160° C. The heating time is preferably 0.2 hr to 8.0 hr. The lower limit of the heating time is more preferably 0.4 hr, further preferably 0.6 hr, furthermore preferably 0.8 hr and yet furthermore preferably 1.0 hr. The upper limit of the heating time is more preferably 6.0 hr, further preferably 4.0 hr, furthermore preferably 3.0 hr and yet furthermore preferably 2.0 hr. The heating time set to be 0.2 hr or more allows the lowering of the viscosity to tend to be able to be developed, and the heating time set to be 8.0 hr or less allows the coloration of the polyisocyanate itself to tend to be able to be suppressed.

When the polyisocyanate composition of the present embodiment is obtained without using the uretdionization reaction catalyst, it is preferable to remove the unreacted diisocyanate monomer after completion of the uretdionization reaction based only on heating and the above-described isocyanuration reaction, from the viewpoint of reducing the unreacted diisocyanate monomer concentration, reducing the molecular weight variation rate after storage of the obtained polyisocyanate composition and reducing the yellowing during high-temperature baking.

The uretonimine group present in the polyisocyanate composition of the present embodiment is obtained by allowing the reaction to proceed by using the uretoniminization reaction catalyst. Specific compound examples of the uretoniminization reaction catalyst include, without being limited to, the following: heterocyclic ring-containing phosphorus-based compounds such as 1-methyl-1-phosphorane, 1-ethyl-1-phosphorane, 1-propyl-1-phosphorane, 1-butyl-1-phosphorane, 1-pentyl-1-phosphorane, 1-hexyl-1-phosphorane, 1-octyl-1-phosphorane, 9-methyl-9-phosphabicyclononane, 9-ethyl-9-phosphabicyclononane, 9-propyl-9-phosphabicyclononane, 9-butyl-9-phosphabicyclononane, 9-pentyl-9-phosphabicyclononane, 9-hexyl-9-phosphabicyclononane, 9-octyl-9-phosphabicyclononane, 9-dodecyl-9-phosphabicyclononane and 9-eicosyl-9-phosphabicyclononane. Many of these compounds simultaneously promote the isocyanuration reaction and the uretdionization reaction, and in addition to the uretonimine group-containing polyisocyanate, an isocyanurate group-containing polyisocyanate and a uretdione group-containing polyisocyanate are produced. At the time of attaining the desired yield, a deactivator of the uretoniminization reaction catalyst such as phosphoric acid, methyl toluenesulfonate, an acid chloride or sulfur is added to terminate the uretoniminization reaction. The uretoniminization reaction is preferably performed by using the above-described catalyst in an amount of 10 to 10000 ppm, more preferably 10 to 1000 ppm, further preferably 10 to 500 ppm based on the mass of the fed diisocyanate and by setting the uretoniminization reaction temperature at 20 to 120° C. The lower limit of the reaction temperature is more preferably 25° C., further preferably 30° C. and furthermore preferably 35° C. The upper limit of the reaction temperature is more preferably 110° C., further preferably 100° C. and furthermore preferably 90° C. The uretoniminization reaction temperature being 120° C. or lower allows the variations of the properties such as coloration to tend to be able to be suppressed.

Alternatively, without using such a uretoniminization reaction catalyst as described above, the uretonimine group can also be obtained by heating the monomer of diisocyanate. The heating temperature concerned is preferably 130° C. to 180° C. The lower limit of the heating temperature is more preferably 140° C., further preferably 145° C., furthermore preferably 150° C. and yet furthermore preferably 155° C. The upper limit of the heating temperature is more preferably 170° C., further preferably 165° C., furthermore preferably 162° C. and yet furthermore preferably 160° C. The heating temperature set to be 120° C. or higher allows the uretoniminization reaction to tend to be able to proceed efficiently, and the heating temperature set to be 180° C. or lower allows the coloration of the polyisocyanate itself to tend to be able to be suppressed. The heating time at the set temperature is preferably 0.2 hr to 8.0 hr. The lower limit of the heating time is more preferably 0.4 hr, further preferably 0.6 hr, furthermore preferably 0.8 hr and yet furthermore preferably 1.0 hr. The upper limit of the heating time is more preferably 6.0 hr, further preferably 5.0 hr, furthermore preferably 4.0 hr and yet furthermore preferably 3.0 hr. The heating time set to be 0.2 hr or more allows the lowering of the viscosity to tend to be able to be developed, and the heating time set to be 8.0 hr or less the coloration of the polyisocyanate itself to tend to be able to be suppressed. Moreover, the temperature increase rate or the temperature decrease rate to the uretoniminization reaction temperature are preferably 0.5° C./min to 2.5° C./min. The lower limit of the above-described rate is more preferably 0.6° C./min, further preferably 0.8° C./min and furthermore preferably 1.0° C./min. The upper limit of the above-described rate is more preferably 2.3° C./min, further preferably 2.15° C./rain and furthermore preferably 2.0° C./min. The temperature increase and decrease rates being 0.5° C./min or more allow the production time to tend to be able to be shortened, and the temperature increase and decrease rates being 2.5° C./min or less allows the uretoniminization reaction to tend to be able to proceed efficiently. When the polyisocyanate composition of the present embodiment is obtained without using the uretoniminization reaction catalyst, it is preferable to remove the unreacted diisocyanate monomer after completion of the uretoniminization reaction based only on heating, and the above-described isocyanuration reaction and uretdionization reaction, from the viewpoint of reducing the unreacted diisocyanate monomer concentration and reducing the increment of the diisocyanate monomer after storage of the obtained polyisocyanate composition.

The isocyanurate-uretdione bonded tetramer present in the polyisocyanate composition of the present embodiment is obtained by using the uretdionization reaction catalyst described below. Specific compound examples of the uretdionization reaction catalyst include, without being limited to, the following: trialkylphosphines, tertiary phosphines, such as tri-n-butylphosphine and tri-n-octylphosphine; tris(dialkylamino)phosphines such as tris-(dimethylamino)phosphine; and cycloalkylphosphines such as cyclohexyl-di-n-hexylphosphine. Many of these compounds also promote the isocyanuration reaction, in addition to the uretdionization reaction. Accordingly, the uretdione group-containing polyisocyanate, the isocyanurate group-containing polyisocyanate, and the isocyanurate.uretdione bonded tetramer are produced. At the time of attaining the desired yield, a deactivator of the uretdionization reaction catalyst such as phosphoric acid or methyl p-toluenesulfonate is added to terminate the uretdionization reaction. The uretdionization reaction is preferably performed by using the above-described catalyst in an amount of 10 to 10000 ppm, more preferably 10 to 1000 ppm, further preferably 10 to 500 ppm based on the mass of the fed diisocyanate and by setting the uretdionization reaction temperature at 20 to 120° C. The lower limit of the reaction temperature is more preferably 25° C., further preferably 30° C. and furthermore preferably 35° C. The upper limit of the reaction temperature is more preferably 110° C., further preferably 100° C. and furthermore preferably 90° C. The uretdionization reaction temperature being 120° C. or lower allows the variations of the properties such as coloration to tend to be able to be suppressed.

Alternatively, without using such a uretdionization reaction catalyst as described above, the isocyanurate.uretdione bonding structure can also be obtained by heating at 120 to 180° C. the reaction mixture after the isocyanuration reaction. The lower limit of the heating temperature is more preferably 130° C., further preferably 140° C. and furthermore preferably 145° C. The upper limit of the heating temperature is more preferably 175° C., further preferably 170° C. and furthermore preferably 165° C. The heating time is preferably 0.2 hr to 8.0 hr. The lower limit of the heating time is more preferably 0.4 hr, further preferably 0.6 hr, furthermore preferably 0.8 hr and yet furthermore preferably 1.0 hr. The upper limit of the heating time is more preferably 6.0 hr, further preferably 4.0 hr, furthermore preferably 3.0 hr and yet furthermore preferably 2.0 hr. The heating time set to be 0.2 hr or more allows the lowering of the viscosity to tend to be able to be developed, and the heating time set to be 8.0 hr or less the coloration of the polyisocyanate itself to tend to be able to be suppressed. When the polyisocyanate composition of the present embodiment is obtained without using the uretdionization reaction catalyst, it is preferable to remove the unreacted diisocyanate monomer after the formation of the isocyanurate.uretdione bonded tetramer by heating after the isocyanuration reaction, from the viewpoint of reducing the unreacted diisocyanate monomer concentration and reducing the increment of the diisocyanate monomer after storage of the obtained polyisocyanate composition.

The allophanate group present in the polyisocyanate composition of the present embodiment is obtained by using HDI in combination with an alcohol compound such as an alkyl monoalcohol or an alkyl diol, and by using an allophanation reaction catalyst. Examples of the alcohol compound usable in the present embodiment include, without being limited to, the following; preferably an alcohol formed of only carbon, hydrogen and oxygen, and more preferably a monoalcohol. The alcohol compound usable in the present embodiment is further preferably an alcohol having a molecular weight of 200 or less. Specific examples of such a compound include: monoalcohols such as methanol, ethanol, propanol, butanol, pentanol, hexanol, heptanol, octanol and nonanol; and dialcohols such as ethylene glycol, 1,3-butanediol, neopentyl glycol and 2-ethylhexanediol. Two or more of these may be used in combination. The addition amount of the alcohol compound is not limited to the following values, but is preferably 1000/1 to 10/1 and more preferably 1000/1 to 100/1, in terms of the equivalent ratio between the isocyanate group of HDI and the hydroxyl group of the alcohol compound. The equivalent ratio being 10/1 or more allows the average number of the isocyanate group to tend to be able to be secured. Specific compound examples of the allophanation reaction catalyst include, without being limited to, the following: alkylcarboxylic acid salts of tin, lead, zinc, bismuth, zirconium and zirconyl, such as organic tin compounds such as tin 2-ethylhexanoate and dibutyltin dilaurate; organic lead compounds such as lead 2-ethylhexanoate; organic zinc compounds such as zinc 2-ethylhexanoate; bismuth 2-ethylhexanoate; zirconium 2-ethylhexanoate; and zirconyl 2-ethylhexanoare.

At the time of attaining the desired yield, a deactivator of the allophanation reaction catalyst such as phosphoric acid or methyl p-toluenesulfonate is added to terminate the allophanation reaction. The allophanation reaction is preferably performed by using the above-described catalyst in an amount of 10 to 10000 ppm, more preferably 10 to 1000 ppm, further preferably 10 to 500 ppm based on the mass of the fed diisocyanate and by setting the allophanation reaction temperature at 60 to 160° C. The lower limit of the reaction temperature is more preferably 70° C., further preferably 80° C. and furthermore preferably 90° C. The upper limit of the reaction temperature is more preferably 155° C., further preferably 150° C. and furthermore preferably 145° C. The allophanation reaction temperature being 160° C. or lower allows the variations of the properties such as coloration to tend to be able to be suppressed. The heating time is preferably 0.2 hr to 8.0 hr. The lower limit of the heating time is more preferably 0.4 hr, further preferably 0.6 hr, furthermore preferably 0.8 hr and yet furthermore preferably 1.0 hr. The upper limit of the heating time is more preferably 6.0 hr, further preferably 4.0 hr, furthermore preferably 3.0 hr and yet furthermore preferably 2.0 hr. The heating time set to be 0.2 hr or more allows the lowering of the viscosity to tend to be able to be developed, and the heating time set to be 8.0 hr or less the coloration of the polyisocyanate itself to tend to be able to be suppressed.

The above-described isocyanuration reaction catalyst can also serve as the allophanation reaction catalyst. When the allophanation reaction is performed by using the above-described isocyanuration reaction catalyst, naturally the isocyanurate group-containing polyisocyanate is also produced. From the viewpoint of the economical production, it is preferable to perform the allophanation reaction and the isocyanuration reaction by using the above-described isocyanuration reaction catalyst as the allophanation reaction catalyst.

The foregoing isocyanuration reaction, uretdionization reaction, uretoniminization reaction, and isocyanurate.uretdione bonded tetramer formation reaction can be successively performed, or alternatively, some of these reactions can also be performed in parallel with each other. When the allophanation reaction is involved, preferably, the isocyanuration reaction and the allophanation reaction are allowed to precede in parallel with each other, and subsequently the uretdionization reaction, the uretoniminization reaction, and the isocyanurate.uretdione bonded tetramer formation reaction are performed. More preferably, the isocyanuration reaction and the allophanation reaction are simultaneously performed by using a common catalyst, and subsequently the uretdionization reaction, the uretoniminization reaction, and the isocyanurate.uretdione bonded tetramer formation reaction are thermally performed; this case is further preferable because the production process can be simplified.

At the time when the polymerization reaction attains the desired degree of polymerization, the polymerization is terminated. The termination of the polymerization reaction is not limited to the following cases, but can be achieved by adding to the reaction solution acidic compounds such as phosphoric acid, acidic phosphoric acid ester, sulfuric acid, hydrochloric acid, and sulfonic acid compound so as to neutralize the polymerization reaction catalyst, or by deactivating the polymerization reaction catalyst, for example, by thermal decomposition or chemical decomposition. After the termination, filtration is performed if necessary.

The reaction solution immediately after the termination of the reaction usually includes the unreacted HDI monomer, and hence it is preferable to remove the unreacted HDI monomer, for example, with a thin film distillation can, or by extraction. Preferably, by performing such a post-treatment, the concentration of the HDI monomer contained in the polyisocyanate composition is controlled to be 1.0% by mass or less. The upper limit of the HDI monomer concentration in the polyisocyanate composition of the present embodiment is more preferably 0.7% by mass or less, further preferably 0.5% by mass or less, furthermore preferably 0.3% by mass or less and yet furthermore preferably 0.2% by mass or less. The HDI monomer concentration set to be the above-described upper limit or less allows the toxicity of the polyisocyanate composition of the present embodiment to tend to be able to be further reduced, and allows the safety of the foregoing polyisocyanate composition to tend to be able to be improved.

[Coating Composition]

The polyisocyanate composition of the present embodiment can also be suitably used as, for example, a curing agent for a coating composition. The coating composition of the present embodiment includes the foregoing polyisocyanate composition of the present embodiment and a resin component. The resin component of the present embodiment is not particularly limited, but preferably includes a compound having within the molecule thereof two or more active hydrogen atoms having reactivity with the isocyanate group. Examples of the compound having within the molecule thereof two or more active hydrogen atoms include, without being limited to, the following: polyol, polyamine and polythiol. Among these, polyol is preferable. Specific examples of the polyol include, without being limited to, the following: polyester polyol, polyether polyol, acrylic polyol, polyolefin polyol and fluorine polyol. Among these, the resin component is preferably acrylic polyol and/or polyester polyol. These compounds each having within the molecule thereof two or more active hydrogen atoms may be used each alone or in combinations of two or more thereof.

The coating composition using the polyisocyanate composition of the present embodiment can be used for either solvent based or water based coating compositions.

When a solvent based coating composition is prepared, for example, to a resin containing a compound having within the molecule thereof two or more active hydrogen atoms or the solvent diluted form thereof, additives such as another resin, a catalyst, a pigment, a leveling agent, an antioxidant, an ultraviolet absorber, a light stabilizer, a plasticizer and a surfactant are added if necessary; to the resulting mixture, the polyisocyanate composition of the present embodiment is added as a curing agent, and a solvent is further added if necessary to regulate the viscosity of the mixture; then, the mixture is stirred by manual stirring or by using a stirring device such as a stirrer manufactured by Mazelar; and thus a solvent-based coating composition can be obtained.

When a water-based coating composition is prepared, for example, a water dispersion or a water-solved form of a resin containing a compound having within the molecule thereof two or more active hydrogen atoms, additives such as another resin, a catalyst, a pigment, a leveling agent, an antioxidant, an ultraviolet absorber, a light stabilizer, a plasticizer and a surfactant are added if necessary; to the resulting mixture, the polyisocyanate composition of the present embodiment is added as a curing agent, and water or a solvent is further added if necessary; then, the mixture is subjected to forced stirring by using a stirring device, and thus a water-based coating composition can be obtained.

The polyester polyol can be obtained by the condensation reaction between, without being limited to, the following, a single acid or an acid mixture of dibasic acids such as carboxylic acids such as succinic acid, adipic acid, dimer acid, maleic anhydride, phthalic anhydride, isophthalic acid, terephthalic acid, and 1,4-cyclohexanedicarboxylic acid, and a single polyhydric alcohol or a mixture of polyhydric alcohols of ethylene glycol, propylene glycol, diethylene glycol, 1,4-butanediol, neopentyl glycol, 1,6-hexanediol, trimethylpentanediol, cyclohexanediol, trimethylolpropane, glycerin, pentaerythritol, 2-methylolpropanediol, and ethoxized trimethylolpropane. For example, the above-described components are mixed, the resulting mixture is heated at approximately 160 to 220° C., and thus, the condensation reaction can be performed. Moreover, for example, polycaprolactones obtained by ring-opening polymerization, using a polyhydric alcohol, of lactones such as ε-caprolactone can also be used as polyester polyols. These polyester polyols can be modified by using aromatic diisocyanates, aliphatic diisocyanates, alicyclic diisocyanates, and polyisocyanates obtained from these diisocyanates. In this case, in particular, aliphatic diisocyanates, alicyclic diisocyanates, the polyisocyanates obtained from these diisocyanates are preferable from the viewpoint of weatherability, yellowing resistance and the like. In the case of using as the water based coating material, a fraction of the carboxylic acids such as dibasic acids is made to remain, the fraction of the carboxylic acids is neutralized with bases such as amines and ammonia, and thus, a water-soluble or a water-dispersible resin can be formed.

Examples of the polyether polyol include, without being limited to, the following: polyether polyols obtained by random or block addition, to polyhydric hydroxy compounds, of a single alkylene oxide or a mixture of alkylene oxides (such as ethylene oxide, propylene oxide, butylene oxide, cyclohexene oxide and styrene oxide), by using a hydroxide (such as lithium, sodium, or potassium hydroxide), a strongly basic catalyst (such as an alcoholate, or an alkylamine), and composite metal cyan compound complex (such as metal porphyrin, or zinc hexacyanocobaltate complex); polyether polyols obtained by allowing an alkylene oxide to react with a polyamine compound (such as ethylenediamines); and so-called polymer polyols obtained by polymerizing acrylamide or the like by using these polyether polyols as media.

Examples of the polyhydric hydroxy compound include, without being limited to, the following: (i) diglycerin, ditrimethylolpropane, pentaerythritol and dipentaerythritol; (ii) sugar alcohol compounds such as erythritol, D-threitol, L-arabinitol, ribitol, xylitol, sorbitol, mannitol, galactitol and rhamnitol; (iii) monosaccharides such as arabinose, ribose, xylose, glucose, mannose, galactose, fructose, sorbose, rhamnose, fucose and ribodesose; (iv) disaccharides such as trehalose, sucrose, maltose, cellobiose, gentiobiose, lactose and melibiose; (v) trisaccharides such as raffinose, gentianose and melezitose; and (vi) tetrasaccharides such as stachyose.

The acrylic polyols are not limited to the acrylic polyols obtained as follows, but can be obtained, for example, by copolymerizing a polymerizable monomer having one or more active hydrogen atoms in one molecule thereof and another monomer copolymerizable with the aforementioned polymerizable monomer.

The acrylic polyols are not limited to the acrylic polyols obtained as follows, but can be obtained, for example, by copolymerizing, by using conventional methods, one or more, as essential components, selected from the following first group with one or more, if necessary, selected from the following second group; the first group consists of active hydrogen-containing acrylic acid esters (such as 2-hydroxyethyl acrylate, 2-hydroxypropyl acrylate and 2-hydroxybutyl acrylate), or active hydrogen-containing methacrylic acid esters (such as 2-hydroxyethyl methacrylate, 2-hydroxypropyl methacrylate, 2-hydroxybutyl methacrylate, 3-hydroxypropyl methacrylate and 4-hydroxybutyl methacrylate); polyhydric active hydrogen-containing (meth)acrylic acid esters such as (meth)acrylic acid monoesters of triols such as glycerin and trimethylolpropane; monoethers obtained from polyether polyols (such as polyethylene glycol, polypropylene glycol and polybutylene glycol) and the above-described active hydrogen-containing (meth)acrylic acid esters; adducts of glycidyl (meth)acrylate with monobasic acids such as acetic acid, propionic acid and p-tert-butylbenzoic acid; and adducts obtained by subjecting lactones (such as ε-caprolactam and γ-valerolactone) to the ring-opening polymerization with the active hydrogen atoms of the above-described active hydrogen-containing (meth)acrylic acid esters; and the second group consists of (meth)acrylic acid esters (such as methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, isobutyl methacrylate, n-hexyl methacrylate, cyclohexyl methacrylate, lauryl methacrylate and glycidyl methacrylate), unsaturated carboxylic acids (such as acrylic acid, methacrylic acid, maleic acid and itaconic acid), unsaturated amides (such as acrylamide, N-methylolacrylamide and diacetone acrylamide), or hydrolyzable silyl group-containing vinyl monomers (such as vinyltrimethoxysilane, vinylmethyldimethoxysilane and γ-(meth)acrylopropyltrimethoxysilane), and other polymerizable monomers (such as styrene, vinyltoluene, vinyl acetate, acrylonitrile and dibutyl fumarate).

For example, acrylic polyols can be obtained by solution polymerizing the above-described monomer components in the presence of the heretofore known radical polymerization initiators such as peroxides and azo compounds, and by diluting, if necessary, with organic solvents or the like. When a water-based acrylic polyol is obtained, the water-based acrylic polyol can be produced by a method in which an olefinically unsaturated compound is solution polymerized and the product is transferred into a water layer, and by heretofore known methods such as emulsion polymerization. In this case, it is possible to impart water solubility or water dispersibility by neutralizing with an amine or ammonia the acidic moieties of the monomers such as the monomers containing a carboxylic acid such as acrylic acid or methacrylic acid or the monomers containing a sulfonic acid.

Examples of the polyolefin polyol include, without being limited to, the following: polybutadienes having two or more hydroxyl groups, hydrogenated polybutadienes, polyisoprene and hydrogenated polyisoprene.

The fluorine polyol is a polyol containing fluorine in the molecule thereof; examples of the fluorine polyol include, without being limited to, the following: copolymers of, for example, fluoroolefins, cyclovinyl ether, hydroxyalkyl vinyl ether and monocarboxylic acid vinyl esters disclosed in, for example, Japanese Patent Laid-Open Nos. 57-341075 and 61-215311.

The hydroxyl value of the polyol is not particularly limited, but is preferably 10 to 200 mg KOH/g. The lower limit of the hydroxyl value of the polyol is more preferably 20 mg KOH/g and further preferably 30 mg KOH/g. The upper limit of the hydroxyl value of the polyol is more preferably 180 mg KOH/g and further preferably 160 mg KOH/g. The hydroxyl value of the polyol being 10 mg KOH/g or more allows the effect of maintaining the solvent resistance of the coating film after cross-linking to tend to be obtained. The hydroxyl value of the polyol being 200 mg KOH/g or less allows the effect of maintaining the pot life after mixing with the polyisocyanate composition to tend to be obtained. The acid value of the polyol is preferably 0 to 30 mg KOH/g. The hydroxyl value and the acid value can be measured according to JIS K1557.

Among the foregoing, as the polyol, acrylic polyol is preferable from the viewpoint of weatherability, chemical resistance and hardness, and polyester polyol is preferable from the viewpoint of mechanical strength and oil resistance. Specifically, the coating composition of the present embodiment preferably includes the polyisocyanate composition of the present embodiment and the acrylic polyol having a hydroxyl value of 10 to 200 mg KOH/g and/or the polyester polyol having a hydroxyl value of 10 to 200 mg KOH/g.

The equivalent ratio (ratio NCO/OH) of the isocyanate group of the polyisocyanate composition of the present embodiment to the hydroxyl group of the above-described compound having two or more active hydrogen atom in the molecule thereof is preferably 0.2 to 5.0, more preferably 0.4 to 3.0 and further preferably 0.5 to 2.0. The equivalent ratio being 0.2 or more allows a further tough coating film to tend to be obtained. The equivalent ratio being 5.0 or less allows the smoothness of the coating film to tend to be further improved.

It is possible to add if necessary to the coating composition melamine-based curing agents such as a perfect alkyl type, a methylol type alkyl and an imino group type alkyl.

The compound having two or more active hydrogen atoms in the molecule thereof, the polyisocyanate composition of the present embodiment and the coating composition of the present embodiment can all be used as mixed with organic solvents. The organic solvent is not particularly limited, but the organic solvent preferably has no functional group to react with a hydroxyl group and an isocyanate group, and is preferably sufficiently compatible with the polyisocyanate composition. Examples of such an organic solvent include, without being limited to, the following compounds generally used as coating material solvents such as ester compounds, ether compounds, ketone compounds, aromatic compounds, ethylene glycol dialkyl ether-based compounds, polyethylene glycol dicarboxylate-based compounds, hydrocarbon-based solvents and aromatic solvents.

The compound having two or more active hydrogen atoms in the molecule thereof, the polyisocyanate composition of the present embodiment and the coating composition of the present embodiment can all be used as mixed with various additives used in the art such as a catalyst, a pigment, a leveling agent, an antioxidant, an ultraviolet absorber, a light stabilizer, a plasticizer and a surfactant, according to the object and application thereof, within ranges not impairing the desired effects of the present embodiment.

Examples of the curing promoting catalyst include, without being limited to, the following: metal salts such as dibutyltin dilaurate, tin 2-ethylhexanoate, zinc 2-ethylhexanoate and cobalt salts; and tertiary amines such as triethylamine, pyridine, methylpyridine, benzyldimethylamine, N,N-dimethylxcyclohexylamine, N-methylpiperidine, pentamethyldiethylenetriamine, N,N'-endoethylenepiperazine and N,N'-dimethylpiperazine.

The coating composition of the present embodiment can be used as, without being limited to, the following: the coating materials for, for example, roll coating, curtain flow coating, spray coating, bell coating and electrostatic coating. For example, the coating composition of the present embodiment is also useful as the coating material for the primer or the upper and intermediate coating for the materials such as metals (such as a steel plate and a surface-treated steel plate), plastic, wood, film, and inorganic materials. The coating composition of the present embodiment is also useful as the coating material for imparting, for example, aesthetics, weatherability, acid resistance, rust prevention and chipping resistance to, for example, precoat metal including anti-rust steel plates and vehicle coating. Moreover, the coating composition of the present embodiment is also useful as a urethane starting material for adhesives, pressure-sensitive adhesives, elastomers, foams and surface-treating agents.

[Coating Film, and Method for Producing Coating Film]

The coating film of the present embodiment is a coating film obtained by curing the coating composition of the present embodiment. The method for producing a coating film of the present embodiment has a step of curing the coating composition of the present embodiment. Because the coating film of the present embodiment is constituted as described above, the coating film of the present embodiment is always develops stable quality and is excellent in the adhesiveness with the foundation coating film.

[Humidity Stabilization Method]

The method for humidity stabilizing the polyisocyanate composition of the present embodiment is a method for humidity stabilizing a polyisocyanate composition obtained from an aliphatic diisocyanate unit including 1,6-diisocyanatohexane, and having an isocyanurate group, a uretdione group, a uretonimine group, and an iminooxadiazinedione group. The molar ratio (uretonimine group to isocyanurate group) of the uretonimine group to the isocyanurate group is set to be 0.0010 to 0.0050, and the molar ratio (iminooxadiazinedione group to isocyanurate group) of the iminooxadiazinedione group to the isocyanurate group is set to be 0.00050 to 0.30. The molar ratio (uretonimine group to isocyanurate group) and the molar ratio (iminooxadiazinedione group to isocyanurate group) set to fall respectively within the above described numerical ranges allow the humidity stability to be achieved in the polyisocyanate composition of the present embodiment.

From the viewpoint of achieving the humidity stabilization of the polyisocyanate composition of the present embodiment, the molar ratio (uretonimine group to isocyanurate group) is preferably 0.0012 to 0.0045, more preferably 0.0015 to 0.0040 and further preferably 0.0020 to 0.0035. The molar ratio (iminooxadiazinedione group to isocyanurate group) is preferably 0.0008 to 0.20, more preferably 0.0012 to 0.10 and further preferably 0.0016 to 0.050 and furthermore preferably 0.0020 to 0.025. The "humidity stability" means the property capable of maintaining the polyisocyanate composition of the present embodiment over a long period of time in a state taking no gel state when the polyisocyanate composition of the present embodiment is allowed to stand under a saturated humidity condition. Specifically, the humidity stability can be verified by the method described in below described Examples.

EXAMPLES

Hereinafter, the present embodiment is described in more detail on the basis of Examples and Comparative Examples; however, the present embodiment is not limited to following Examples.

[Properties]

<Viscosity>

The viscosity was measured by using an E-type viscometer (manufactured by Tokimec Inc.) at 25° C. In the measurement, a standard rotor (1°34'×R24) was used. The number of rotations was as follows.

100 rpm (in the case of less than 128 mPa·s)

50 rpm (in the case of 128 mPa·s or more and less than 256 mPa·s)

20 rpm (in the case of 256 mPa·s or more and less than 640 mPa·s)

10 rpm (in the case of 640 mPa·s or more and less than 1280 mPa·s)

5 rpm (in the case of 1280 mPa·s or more and less than 2560 mPa·s)

The nonvolatile content of the polyisocyanate composition produced in each of below-described Examples and Comparative Examples was examined by the below-described method, and when the nonvolatile content was 98% by mass or more, the polyisocyanate composition was used as it was for the measurement.

<Nonvolatile Content>

The nonvolatile content was determined from the residual amount in the case of heating of the polyisocyanate composition at 105° C., for 3 hours, on the basis of the following formula:

Nonvolatile content (% by mass)=(mass of polyisocyanate composition after heating at 105° C., for 3 hours)/(mass of polyisocyanate composition before heating)×100

<NCO Content>

The NCO content (% by mass) was determined by neutralizing the isocyanate group in the measurement sample with excessive 2N amine, and then performing back-titration with 1N hydrochloric acid. It is to be noted that the nonvolatile contents of the polyisocyanate compositions produced in below-described Examples and Comparative Examples were checked by the above-described method, and the compositions having a nonvolatile content of 98% by mass or more were used as they were for the measurement.

<HDI Monomer Mass Concentration>

First, a 20-mL sample bottle was placed on a digital balance and approximately 1 g of a sample was weighed accurately. Next, 0.03 to 0.04 g of nitrobenzene (an internal standard liquid) was added, and the resulting mixture was weighed accurately. Further, approximately 9 mL of ethyl acetate was added to the mixture, then the cap was set tightly, and the resulting mixture was sufficiently mixed to prepare a sample. The prepared solution was subjected to a quantitative analysis based on a gas chromatography analysis under the following conditions.

Apparatus: GC-8A manufactured by Shimadzu Corp.

Column: Silicone OV-17 manufactured by Shinwa Chemical Industries Ltd.

Column oven temperature: 120° C.

Injection/detector temperature: 160° C.

<Molar Ratios of Uretdione Group/Isocyanurate Group, uretonimine group/Isocyanurate Group, Iminooxadiazinedione Group/Isocyanurate Group and Allophanate Group/Isocyanurate Group>

By the $^{13}$C-NMR measurements using the Avance 600 (trade name) manufactured by Bruker Biospin Corp., the molar ratios of the uretdione group/the isocyanurate group, the uretonimine group/the isocyanurate group, the iminooxadiazinedione group/the isocyanurate group and the allophanate group/the isocyanurate group were determined. Specific measurement conditions were as follows.

$^{13}$C-NMR apparatus: AVANCE 600 (manufactured by Bruker Biospin Corp.)
CryoProbe: CP DUL 600S3 C./H-D-05 Z (manufactured by Bruker Biospin Corp.)
Resonance frequency: 150 MHz
Concentration: 60 wt/vol %
Shift reference: CDCl$_3$ (77 ppm)
Accumulation number: 10000
Pulse program: zgpg 30 (proton perfect decoupling methods, waiting time: 2 sec)

In the above-described measurements, the following signal integrated values were divided by the number of the measured carbon(s), and the molar ratios were determined from the obtained values.

Isocyanurate group: Around 148.6 ppm: integrated value÷3
Uretdione group: Around 157.5 ppm: integrated value÷2
Allophanate group: Around 154 ppm: integrated value÷1
Uretonimine group: Around 159.5 ppm: integrated value÷1
Iminooxadiazinedione group: Around 137.3 ppm: integrated value÷1

<Ratio of Isocyanurate.Uretdione Bonded Tetramer/Isocyanurate Trimer>

The presence ratio in the polyisocyanate composition of the isocyanurate.uretdione bonded tetramer (referred to as the compound β) prepared by polymerization of four molecules of 1,6-diisocyanatohexane to the isocyanurate trimer (referred to as the compound α) prepared by polymerization of three molecules of 1,6-diisocyanatohexane was determined according to the following method. Specifically, the terminal isocyanato groups of the compound α and the compound β in the polyisocyanate composition were urethanized with methanol, and then the polyisocyanate composition was analyzed with a liquid chromatograph/mass spectrometer (LC/MS). Hereinafter, the sample preparation method and the measurement method are described.

(1) Sample Preparation Method

The polyisocyanate composition was weighed in an amount of 100 mg, and methanol was added to the polyisocyanate composition for the concentration of the polyisocyanate composition to be 10 mg/mL. Subsequently, the resulting solution was allowed to stand still for 2 days, and thus the isocyanato groups present were allowed to perfectly react with methanol to prepare a methanol solution.

(2) Measurement Method

The methanol solution obtained above was subjected to measurement by using the following apparatus.
LC
Apparatus: Waters ACQUITY UPLC
Column: Phenomenex, Kinetex 2.6μ XB-C18 100A (internal diameter: 2.1 mm, length: 50 mm)
Column temperature: 40° C.
Detection: 220 nm
Flow rate: 0.3 mL/min
Mobile phase: The following gradients of solutions A and B
A=water (0.05% formic acid), B=acetonitrile (0.05% formic acid)
Gradient conditions

| Time (min) | A % | B % |
|---|---|---|
| 0 | 60 | 40 |
| 12 | 0 | 100 |
| 12.1 | 60 | 40 |
| 20 | 60 | 40 |

Injection volume: 1 μL
MS
Apparatus: Waters, Synapt G2
Ionization: ESI
Mode: Positive
Scan range: m/z 250 to 2000

The aforementioned presence ratio was calculated from the peak area ratio (γ/α) of the methanol adduct of the isocyanurate.uretdione bonded tetramer prepared by polymerization of four molecules of HDI (compound β; the following formula (VIII)) to the methanol adduct of the isocyanurate trimer prepared by polymerization of three molecules of HDI (compound α; the following formula (VII)). The compound α was detected around a retention time of 1.55 minutes at a detected ion (m/z) of 601. The compound β was detected around a retention time of 3.44 minutes at a detected ion (m/z) of 769. In the following formulas (VII) and (VIII), Me represents a methyl group.

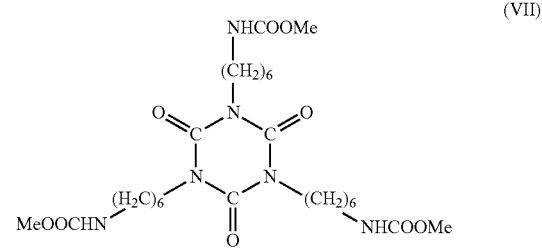

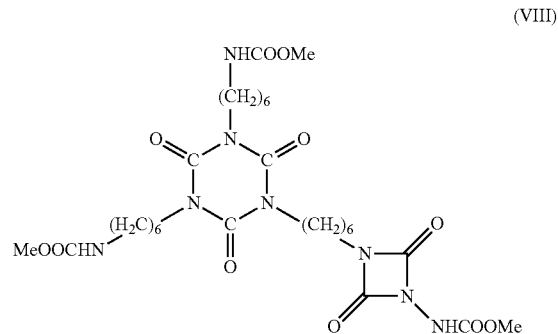

<Increment of Diisocyanate Monomer (DI) after Storage>

After the polyisocyanate composition was stored in a nitrogen atmosphere at 40° C. for 30 days, the diisocyanate monomer concentration was measured by the gas chromatograph measurement under the above-described measurement conditions of the HDI monomer mass concentration. The cases where the increase of the diisocyanate monomer concentration after storage was 0.15% by mass or less, more than 0.15% by mass and 0.20% by mass or less, more than 0.20% by mass and 0.25% by mass or less and more than 0.25% by mass are marked with "⊚, ○, Δ and x," respectively.

<Humidity Stability>

The polyisocyanate composition in an amount of 5.0 g and butyl acetate in an amount of 5.0 g were mixed with each other, and the number of days elapsed until the gelation state of the resulting mixture was reached at 20° C., under saturated humidity condition, was evaluated. The cases where the number of days elapsed until the gelation state was reached was less than 2 days, 2 days or more and less than 3 days, 3 days or more and less than 4 days and 4 days or more are marked with "x, Δ, ○ and ⊚," respectively.

<Adhesiveness with Foundation>

An acrylic polyol (resin solid content concentration: 55%, hydroxyl value: 30 mg KOH/resin g) was applied to a mild steel plate so as for the resin film thickness to be 40 μm, and was allowed to stand at room temperature for 30 minutes. Subsequently, acrylic polyol (Setalux 1903, product name of Nuplex Resin Inc., resin solid content concentration: 75%, hydroxyl value: 150 mg KOH/resin g) and the polyisocyanate composition were mixed with each other so as for the equivalent ratio between the hydroxyl group and the isocyanate group to be 1:1, and thus a coating material was obtained. Subsequently, the viscosity of the coating material was regulated with butyl acetate so as to be 20 seconds with the Ford Cup No. 4, and thus a coating composition was obtained. The coating composition was applied to the mild steel plate coated with acrylic polyol so as for the resin film thickness to be 30 μm. The mild steel plate thus coated was allowed to stand at room temperature for 15 minutes, and then the coated resin was cured for 30 minutes in an oven set at 90° C. The adhesiveness test of the resulting coating film was performed according to JIS K5600-5-6. The case where neither detachment nor raise of the coating film was found is marked with "⊚," the case where the cut portion was partially raised is marked with "○," the case where a half or less of the coating film was detached is marked with "Δ," and the case where a half or more of the coating film was detached is marked with "x."

[Polyisocyanate Composition]

Example 1

The inside of a four-necked flask equipped with a stirrer, a thermometer, a reflux condenser tube, a nitrogen blowing tube and a dropping funnel was turned into a nitrogen atmosphere, and then in the four-necked flask, 6,000 g of HDI and 7.0 g of isobutanol were fed, and the temperature inside the reactor was maintained under stirring at 80° C. for 2 hr. Subsequently, to the resulting mixture, 5.0 g of a solution prepared by diluting an isocyanuration catalyst, trimethyl-2-methyl-2-hydroxy ethyl ammonium hydroxide with isobutanol to a concentration of 5% by mass was added, the isocyanuration reaction was performed, and at the time when the NCO content of the reaction liquid came to be 44.6% by mass, phosphoric acid was added to the reaction liquid to terminate the reaction. The uretdione dimer concentration increased by this reaction was 1.0% by mass or less. Subsequently, the reaction liquid was increased in temperature to 160° C. at a temperature increase rate of 1.6° C./min, and was maintained at 160° C. for 1 hr. Subsequently, the reaction liquid was decreased in temperature to 40° C. at a temperature decrease rate of 1.5° C./min. This heating produced the uretdione group, the uretonimine group, and the isocyanurate.uretdione bonding structure. The reaction solution was purified twice by using a thin film distillation can, under the conditions of 160° C. and 0.2 Torr, to yield a polyisocyanate composition P-1 having a nonvolatile content of 99.5% by mass, a viscosity of 520 mPa·s (25° C.), an NCO content of 23.1% by mass and an HDI monomer concentration of 0.11% by mass.

According to the $^{13}$C-NMR measurement, the molar ratio of the uretdione group/the isocyanurate group was 0.32, the molar ratio of the uretonimine group/the isocyanurate group was 0.0022, the molar ratio of the iminooxadiazinedione group/the isocyanurate group was 0.0038 and the molar ratio of the allophanate group/the isocyanurate group was 0.07. On the basis of liquid chromatography, the area ratio of the isocyanurate.uretdione bonded tetramer/the isocyanurate trimer was 0.065. Subsequently, the increment of the diisocyanate (DI) after storage of the polyisocyanate composition and the humidity stability were evaluated; additionally, a coating composition was produced by using the polyisocyanate composition, and the adhesiveness with foundation after application and drying was evaluated. The evaluation results are shown in Table 1.

Example 2

The inside of a four-necked flask equipped with a stirrer, a thermometer, a reflux condenser tube, a nitrogen blowing tube and a dropping funnel was turned into a nitrogen atmosphere, and then in the four-necked flask, 6,000 g of HDI and 11.0 g of isobutanol were fed, and the temperature inside the reactor was maintained under stirring at 80° C. for 2 hr. Subsequently, to the resulting mixture, 5.0 g of a solution prepared by diluting an isocyanuration catalyst, trimethyl-2-methyl-2-hydroxy ethyl ammonium hydroxide with isobutanol to a concentration of 5% by mass was added, the isocyanuration reaction was performed, and at the time when the NCO content of the reaction liquid came to be 45.5% by mass, phosphoric acid was added to the reaction liquid to terminate the reaction. The uretdione dimer concentration increased by this reaction was 1.0% by mass or less. Subsequently, the reaction liquid was increased in temperature to 160° C. at a temperature increase rate of 1.6° C./min, and was maintained at 160° C. for 1 hr. Subsequently, the reaction liquid was decreased in temperature to 40° C. at a temperature decrease rate of 1.5° C./min. This heating produced the uretdione group, the uretonimine group, and the isocyanurate-uretdione bonding structure. The reaction solution was purified twice by using a thin film distillation can, under the conditions of 160° C. and 0.2 Torr, to yield a polyisocyanate composition P-2 having a nonvolatile content of 99.5% by mass, a viscosity of 280 mPa·s (25° C.), an NCO content of 23.2% by mass and an HDI monomer concentration of 0.11% by mass. The subsequent measurements and evaluations were performed in the same manner as in Example 1. The evaluation results are shown in Table 1.

Example 3

The temperature increase rate and the temperature decrease rate of the reaction liquid after the isocyanuration reaction were altered to 2.2° C./min and 2.4° C./min, respectively. Under the same other conditions as in Example 1, the operations were performed to yield a polyisocyanate composition P-3. The subsequent measurements and evaluations were performed in the same manner as in Example 1. The evaluation results are shown in Table 1.

Example 4

The heating conditions of the reaction liquid after the isocyanuration reaction were altered to the heating conditions of 155° C. and 1.0 hr.

Under the same other conditions as in Example 1, the operations were performed to yield a polyisocyanate composition P-4.

The subsequent measurements and evaluations were performed in the same manner as in Example 1. The evaluation results are shown in Table 1.

Example 5

The heating conditions of the reaction liquid after the isocyanuration reaction were altered to the heating conditions of 165° C. and 5.0 hr. Under the same other conditions as in Example 1, the operations were performed to yield a polyisocyanate composition P-5. The subsequent measurements and evaluations were performed in the same manner as in Example 1. The evaluation results are shown in Table 1.

Comparative Example 1

The temperature increase rate and the temperature decrease rate of the reaction liquid after the isocyanuration reaction were altered to 2.6° C./min and 4.5° C./min, respectively. Under the same other conditions as in Example 1, the operations were performed to yield a polyisocyanate composition C-1. The subsequent measurements and evaluations were performed in the same manner as in Example 1. The evaluation results are shown in Table 2.

Comparative Example 2

After the isocyanuration reaction, the reaction liquid was increased in temperature to 165° C. at a temperature increase rate of 0.3° C./min, and was maintained at 165° C. for 8 hr. Subsequently, the reaction liquid was decreased in temperature to 40° C. at a temperature decrease rate of 0.3° C./min. Under the same other conditions as in Example 1, the operations were performed to yield a polyisocyanate composition C-2. The subsequent measurements and evaluations were performed in the same manner as in Example 1. The evaluation results are shown in Table 2.

Comparative Example 3

The inside of a four-necked flask equipped with a stirrer, a thermometer, a reflux condenser tube, a nitrogen blowing tube and a dropping funnel was turned into a nitrogen atmosphere, and then in the four-necked flask, 6,000 g of HDI and 7.0 g of isobutanol were fed, and the temperature inside the reactor was maintained under stirring at 80° C. for 2 hr. Subsequently, to the resulting mixture, 5.0 g of a solution prepared by diluting an isocyanuration catalyst, trimethyl-2-methyl-2-hydroxy ethyl ammonium hydroxide with isobutanol to a concentration of 5% by mass was added, the isocyanuration reaction was performed, and at the time when the NCO content of the reaction liquid came to be 44.1% by mass, phosphoric acid was added to the reaction liquid to terminate the reaction. The uretdione dimer concentration increased by this reaction was 1.0% by mass or less. The reaction liquid was further maintained at 100° C. for 1 hr. The reaction solution was purified twice by using a thin film distillation can, under the conditions of 160° C. and 0.2 Torr, to yield a polyisocyanate composition C-3 having a nonvolatile content of 99.5% by mass, a viscosity of 1050 mPa·s (25° C.), an NCO content of 23.1% by mass and an HDI monomer concentration of 0.09% by mass. The subsequent measurements and evaluations were performed in the same manner as in Example 1. The evaluation results are shown in Table 2.

Comparative Example 4

The inside of a four-necked flask equipped with a stirrer, a thermometer, a reflux condenser tube, a nitrogen blowing tube and a dropping funnel was turned into a nitrogen atmosphere, and then in the four-necked flask, 6,000 g of HDI was fed, and the temperature inside the reactor was maintained under stirring at 30° C. for 2 hr. Subsequently, 14.8 g (0.1 mol) of 1-butylphosphorane was added to the reaction liquid, and the reaction liquid was maintained as it was for 15 hr. Subsequently, 3.6 g (0.11 mol) of elemental sulfur was added to the reaction liquid to terminate the reaction. The reaction solution was purified twice by using a thin film distillation can, under the conditions of 160° C. and 0.2 Torr, to yield a polyisocyanate composition C-4 having a nonvolatile content of 99.5% by mass, a viscosity of 1000 mPa·s (25° C.), an NCO content of 23.3% by mass and an HDI monomer concentration of 0.12% by mass. The subsequent measurements and evaluations were performed in the same manner as in Example 1. The evaluation results are shown in Table 2.

Comparative Example 5

The inside of a four-necked flask equipped with a stirrer, a thermometer and a nitrogen blowing tube was turned into a nitrogen atmosphere, and then in the four-necked flask, 700 g of the polyisocyanate composition C-1 obtained in Comparative Example 1 and 300 g of the polyisocyanate composition C-4 obtained in Comparative Example 4 were fed, and the resulting mixture was stirred at 40° C. for 2 hr to yield a polyisocyanate composition C-5. The subsequent measurements and evaluations were performed in the same manner as in Example 1. The evaluation results are shown in Table 2.

Example 6

The inside of a four-necked flask equipped with a stirrer, a thermometer and a nitrogen blowing tube was turned into a nitrogen atmosphere, and then in the four-necked flask, 820 g of the polyisocyanate composition C-1 obtained in Comparative Example 1 and 180 g of the polyisocyanate composition C-4 obtained in Comparative Example 4 were fed, and the resulting mixture was stirred at 40° C. for 2 hr to yield a polyisocyanate composition P-6. The subsequent measurements and evaluations were performed in the same manner as in Example 1. The evaluation results are shown in Table 1.

Hereinafter, in Table 1 and Table 2, the "molar ratio B/A" represents (the uretdione group absorption×½)/(the isocyanurate group absorption×⅓) calculated from the integrated values in the $^{13}$C-NMR, the "molar ratio C/A" represents (the uretonimine group absorption)/(the isocyanurate group absorption×⅓) calculated from the integrated values in the $^{13}$C-NMR, the "molar ratio D/A" represents (the iminooxadiazinedione group absorption)/(the isocyanurate group absorption×⅓) calculated from the integrated values in the $^{13}$C-NMR, the "molar ratio E/A" represents (the allophanate group absorption)/(the isocyanurate group absorption×⅓) calculated from the integrated values in the $^{13}$C-NMR, and the "ratio F/A" represents (the isocyanurate.uretdione bonded tetramer)/(the isocyanurate trimer) calculated from the area ratio in the liquid chromatography.

TABLE 1

|  | Example 1 | Example 2 | Example 3 | Example 4 | Example 5 | Example 6 |
| --- | --- | --- | --- | --- | --- | --- |
| Polyisocyanate composition | P-1 | P-2 | P-3 | P-4 | P-5 | P-6 |
| Molar ratio B/A | 0.320 | 0.370 | 0.250 | 0.280 | 0.350 | 0.290 |
| Molar ratio C/A | 0.0022 | 0.0026 | 0.0013 | 0.0018 | 0.0036 | 0.0041 |
| Molar ratio D/A | 0.0038 | 0.0055 | 0.0018 | 0.0023 | 0.0072 | 0.1080 |
| Molar ratio E/A | 0.070 | 0.230 | 0.070 | 0.070 | 0.070 | 0.060 |
| Ratio F/A | 0.065 | 0.075 | 0.053 | 0.060 | 0.071 | 0.051 |
| Viscosity mPa·s/25° C. | 520 | 280 | 540 | 530 | 510 | 620 |
| NCO content (% by mass) | 23.1 | 23.2 | 23.1 | 23.1 | 23.1 | 23.1 |
| DI increment after storage | ○ | ○ | ○ | ○ | ○ | ○ |
| Humidity stability | ◎ | ◎ | ○ | ○ | ○ | ○ |
| Adhesiveness with foundation | ◎ | ◎ | ◎ | ◎ | ◎ | ◎ |

TABLE 2

|  | Comparative Example 1 | Comparative Example 2 | Comparative Example 3 | Comparative Example 4 | Comparative Example 5 |
| --- | --- | --- | --- | --- | --- |
| Polyisocyanate composition | C-1 | C-2 | C-3 | C-4 | C-5 |
| Molar ratio B/A | 0.300 | 0.420 | 0.012 | 0.270 | 0.290 |
| Molar ratio C/A | 0.0008 | 0.0055 | 0.0001> | 0.0190 | 0.0063 |
| Molar ratio D/A | 0.0023 | 0.0085 | 0.0019 | 0.5900 | 0.1780 |
| Molar ratio E/A | 0.070 | 0.070 | 0.070 | 0.0001> | 0.050 |
| Ratio F/A | 0.060 | 0.084 | 0.001> | 0.008 | 0.044 |
| Viscosity mPa·s/25° C. | 530 | 510 | 1050 | 1000 | 690 |
| NCO content (% by mass) | 23.1 | 23.1 | 23.1 | 23.3 | 23.1 |
| DI increment after storage | ○ | Δ | ◎ | X | Δ |
| Humidity stability | Δ | ○ | Δ | ○ | ○ |
| Adhesiveness with foundation | ◎ | ○ | X | Δ | ○ |

The polyisocyanate compositions of Examples 1 to 6 were verified to be low in viscosity, excellent in storage stability and humidity stability, and capable of forming coating films excellent in the adhesiveness with foundation coating films.

The present application is based on Japanese Patent Application (Japanese Patent Application No. 2014-179998) filed at Japan Patent Office on Sep. 4, 2014, and the contents thereof are incorporated herein by reference.

INDUSTRIAL APPLICABILITY

The coating composition using, as a curing agent, the polyisocyanate composition according to the present invention can be used as the coating materials for, for example, roll coating, curtain flow coating, spray coating, bell coating and electrostatic coating. The coating composition can also be used as the coating material for the primer or the upper and intermediate coating for the materials such as metals such as a steel plate and a surface-treated steel plate, plastic, wood, film, and inorganic materials. Additionally, the coating composition is also useful as the coating material for imparting, for example, heat resistance and aesthetics (surface smoothness and image clarity) to, for example, precoat metal including anti-rust steel plates and vehicle coating. Moreover, the coating composition is also useful as a urethane starting material for adhesives, pressure-sensitive adhesives, elastomers, foams and surface-treating agents.

Additionally, when the coating composition is used for the curing agents of water-based coating materials, the VOC components can also be reduced, and hence can be used in wide fields as, for example, starting materials of water-based coating materials for plastic and water-based vehicle coating materials.

The invention claimed is:

1. A polyisocyanate composition
   wherein the composition is obtained from an aliphatic diisocyanate unit including 1,6-diisocyanatohexane, and has an isocyanurate group, a uretdione group, a uretonimine group, and an iminooxadiazinedione group, and
   the molar ratio of the uretonimine group to the isocyanurate group is 0.0010 to 0.0050, and the molar ratio of the iminooxadiazinedione group to the isocyanurate group is 0.00050 to 0.30.

2. The polyisocyanate composition according to claim 1 further comprising an isocyanurate.uretdione bonded tetramer represented by following formula (I):

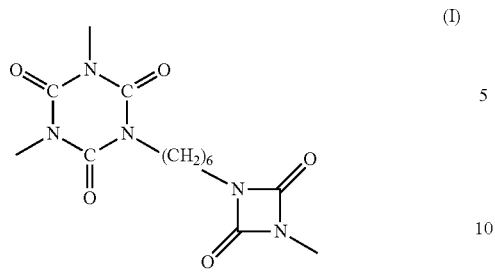

(I)

3. A coating composition comprising the polyisocyanate composition according to claim 1, and an acrylic polyol and/or a polyester polyol.

4. A method for producing a coating film comprising a step of curing the coating composition according to claim 3.

5. A coating composition comprising the polyisocyanate composition according to claim 2, and an acrylic polyol and/or a polyester polyol.

6. A method for producing a coating film comprising a step of curing the coating composition according to claim 5.

* * * * *